(12) United States Patent
Koves

(10) Patent No.: US 7,438,191 B2
(45) Date of Patent: Oct. 21, 2008

(54) ANGLE ROD SCREEN DESIGN

(75) Inventor: William J. Koves, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 11/611,233

(22) Filed: Dec. 15, 2006

(65) Prior Publication Data
US 2008/0145288 A1 Jun. 19, 2008

(51) Int. Cl.
*B07B 1/49* (2006.01)
(52) U.S. Cl. .................. 209/392; 209/362; 166/231
(58) Field of Classification Search .......... 209/392, 209/362; 166/231
See application file for complete search history.

(56) References Cited

U.S. PATENT DOCUMENTS

| | | | |
|---|---|---|---|
| 1,858,592 A * | 5/1932 | Johnson | 166/231 |
| 2,046,458 A | 7/1936 | Johnson | 166/8 |
| 4,276,265 A * | 6/1981 | Gillespie | 422/311 |
| 5,118,419 A * | 6/1992 | Evans et al. | 210/291 |
| 5,643,458 A * | 7/1997 | Nagaoka | 210/702 |
| 6,138,838 A * | 10/2000 | Soik et al. | 210/415 |
| 6,224,838 B1 | 5/2001 | Schulz et al. | 422/218 |
| 7,226,568 B1 * | 6/2007 | Ham et al. | 422/218 |

* cited by examiner

*Primary Examiner*—Patrick H Mackey
*Assistant Examiner*—Terrell H Matthews
(74) *Attorney, Agent, or Firm*—Arthur E Gooding

(57) ABSTRACT

A screen for use in distributing a fluid in a process flow system. The screen provides support, and provides for the ability to clean particulates from the screen. The screen includes profiled wires affixed to a support, where the support provides channels to distribute the fluid over the screen. The support includes spacing to improve the cleaning of particulates from the screen.

11 Claims, 2 Drawing Sheets

ANGLE ROD SCREEN DESIGN

FIELD OF THE INVENTION

This invention relates to screens for the distribution of a fluid in a process flow stream application. In particular, this invention relates to reducing the pressure drop, and providing a design for improved flow and to remove particulates accumulated at the screen.

BACKGROUND OF THE INVENTION

Currently, wire screen supports for radial flow reactors use horizontal support rods. The horizontal support rods increase the pressure drop by presenting projections that interfere with the flow of fluid into the reactor. The design of screens for use in radial flow reactors is for a sufficient pressure drop to provide a uniform distribution of the flow of fluid through the reactor. A conventional well screen with profiled wires can be found in U.S. Pat. No. 2,046,458. The wires are helically wrapped around a plurality of longitudinal rods, and welded to the rods to define slots of predetermined widths. After the wires are welded to the rods to form the screen, the screen is opened and flattened. The flattened screen can then be rolled to from a cylindrical screen with the wires in the longitudinal direction and forming slots that run the length of the cylindrical surface of the screen. The screen can be rolled such that the wires are on the inner surface of the outer screen for a radial flow reactor, or rolled such that the wires are on the outer surface of the inner screen for the radial flow reactor.

An increase in pressure drop along the axial direction of the reactor on the fluid side produces a non-uniform distribution of the flow of fluid and adversely affects the distribution of fluid flow through the reactor. One improvement in the screen design for the radial flow reactor is found in U.S. Pat. No. 4,276,265 where channel members are used in the formation of the screen, instead of conventional support rods. The channel members are placed such that they abut one another to form a relatively smooth surface for the screen to reduce the pressure drop on the fluid side of the screen.

However, this design while addressing the pressure drop problem associated with use in a radial flow reactor creates a cleaning and maintenance problem. The screen with the channels create regions of the reactor that accumulate fines from the catalyst and collect within the channels. The design inhibits removal of the fines and requires substantial dismantling of the reactor in order to remove the fines and to prepare the reactor for reuse.

SUMMARY OF THE INVENTION

The invention is a screen assembly for distributing a flow stream to flow substantially uniformly through the screen. The screen assembly further is designed for producing a lower pressure drop along the screen and for facilitating cleaning the screen. The screen assembly includes a plurality of wires spaced apart in a substantially parallel orientation and mounted to a support to maintain the wire spacing, where the spaces between the wires define slots that permit the passage of a fluid. The screen assembly further includes a plurality of angled rods that form the support for the wires. The angled rods have a generally L shaped configuration and where one edge of the L shape is affixed to the wires in a substantially perpendicular orientation. The angled rods form partially covered channels for fluid to distribute and flow through the wire screen. The second edge of the L shape is spaced from a neighboring angled rod to form a gap. The gap is sized to be greater than the space between the wires and facilitates the removal of fines that can accumulate in the partially covered channels.

Other objects, advantages and applications of the present invention will become apparent to those skilled in the art from the following detailed description and drawings.

DETAILED DESCRIPTION OF THE INVENTION

A wire screen reactor is a reactor where the screen is a series of parallel wires having a substantially uniform spacing between the wires and sufficiently small such that catalyst particles cannot pass through the spacing. The wires are disposed in a parallel and vertical orientation in the reactor, and catalyst can flow in the direction of wires in the wire screen. The wires are affixed, usually by welding, to support rods that maintain the spacing between the wires. The wires are usually shaped to provide for sufficient rigidity to prevent the wires from bending and thereby maintaining the spacing between the wires. An example of a conventional wire screen can be seen in U.S. Pat. Nos. 2,046,458 and 4,276,265 which are incorporated by reference in their entirety.

A problem exists during the operation of a reactor using screens. A catalyst, or an adsorbent, generates fines and the fines penetrate the screen. In a cross-flow reactor with channels surrounding the screen, the fines collect in channels around the screen, and are not easily removed from the channels. This creates plugging problems, as it adversely affects the flow of fluid through the channels. If the amount of fines is great, replacement of the screen is necessary, which is an expensive operation that entails a substantial down time. Being able to clean the screens without removing the screens from the reactor provides a longer life for the screen as well as less down time for the reactor providing substantial savings.

Figure 1:
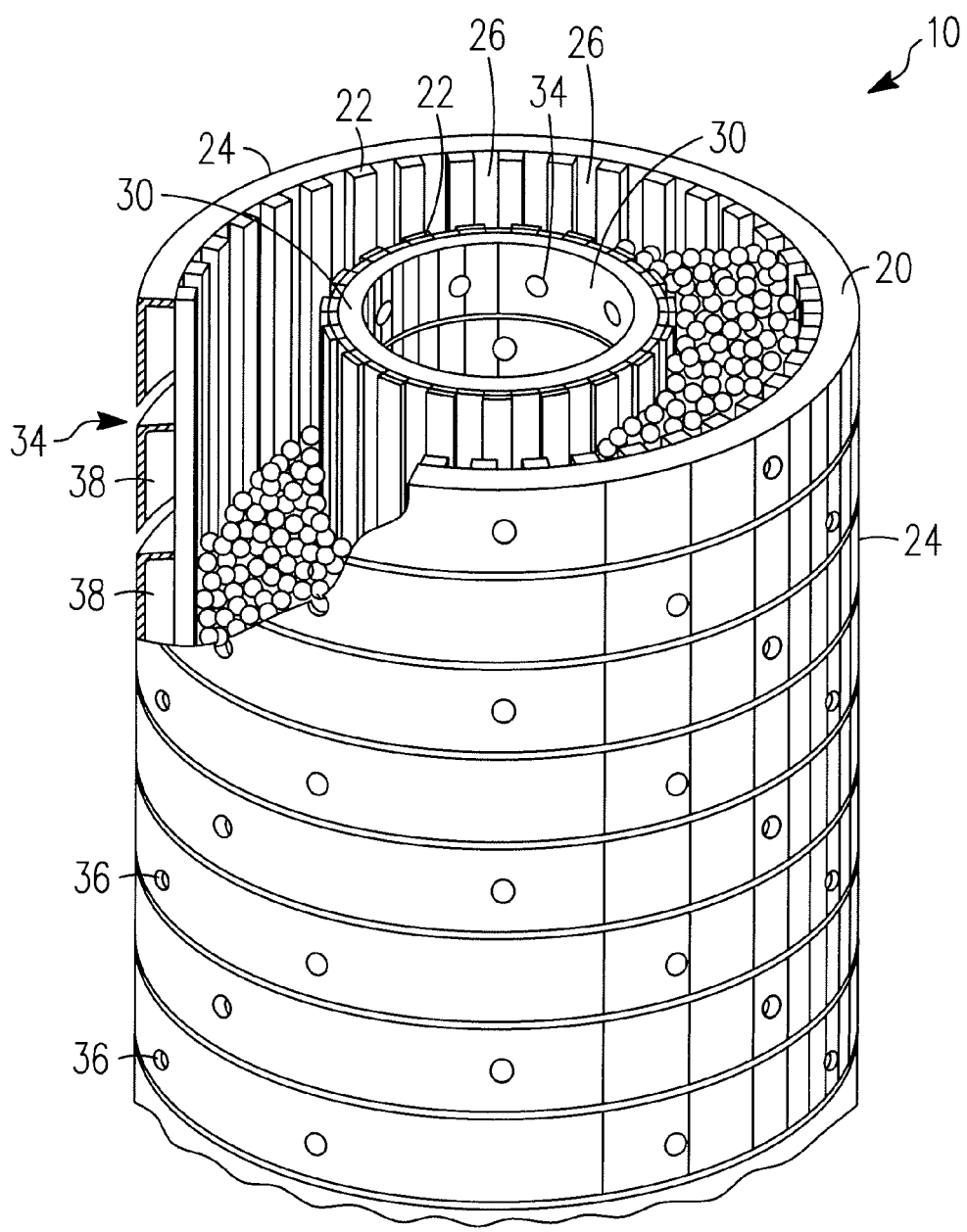
FIG. 1 is a partial perspective view of a radial flow reactor with screens of the present invention.
Figure 2:
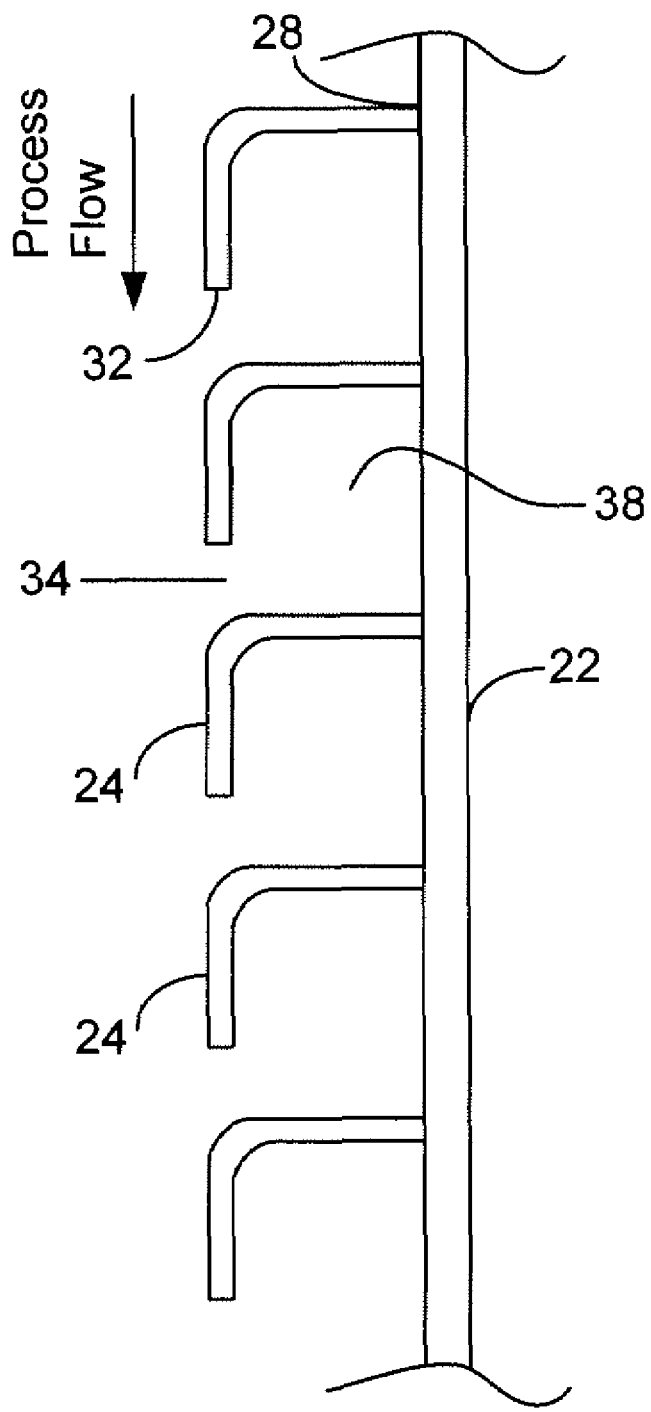
FIG. 2 is a cross-section of the screen of the present invention.

A radial flow reactor 10 is shown in FIG. 1, where there is an outer screen 20 and an inner screen 30. The screens 20, 30 are made of a plurality of wires 22 spaced apart in a substantially parallel orientation. The wires 22 are mounted to a plurality of supports 24 and form a screen, where the spacing between the wires 22 define slots 26 for the passage of a fluid. The supports 24 are a plurality of angled rods 24 generally having an 'L' shaped configuration, and where there is a first edge at one end of the 'L' and a second edge at the other end of the 'L'. The wires 22 are affixed to a first edge of the angled rods 24 and oriented substantially perpendicularly to the angled rods 24. A vertical cross-section of the screen 20 is shown in FIG. 2. The cross-section shows the angled rods 24 in a spaced apart orientation, with the first edge 28 affixed to the wires 22. The second edge 32 of the angled rods 24 is spaced apart from a neighboring angled rod 24 to form a gap 34. The angled rods 24 form partially covered channels on the fluid side of the screen 20. The gap 34 formed between the angled rods 24 is greater than the width of the slots 26 between the wires 22 forming the screens 20, 30. This allows for any solids that pass through the slots 26 will also pass through the channel gaps 34.

The wires 22 in the screen 20 preferably have a vertical orientation to facilitate the flow of catalyst through the reactor 10, without creating snags or discontinuities that can catch or abrade the catalyst. This creates long vertical slots 26 on the catalyst side of the screens 20, 30 and allows the catalyst to move smoothly through the reactor 10. It is also preferred that the wires 22 are profiled wires 22 and have a substantially flat side opposite the side of the wires 22 affixed to the support 24.

In one embodiment, the angled rods 24 include apertures 36 for the flow of fluid into the region 38 underneath the angled rods 24 where the fluid subsequently flows through the wire screen 20. It is desired that the fluid flowing through the screen is distributed substantially evenly across the screen, and flows substantially uniformly radially across the reactor bed. To promote the uniform distribution of flowing fluid over the screen it is useful to limit the amount of pressure gradients over the surface of the screen. To promote this, the total area of the apertures 36 and the channel gaps 34 is greater than the total area of the slots 26 between the wires 22.

In one embodiment, the angled rods 24 are periodically attached to neighboring angled rods 24. The attachment can be by welding, or other means known to those skilled in the art, and provides additional strength and rigidity to the screens 20, 30.

It is preferred that the slots 26 have a spacing of about 0.5 times, or less, the typical pellet size. For a typical pellet, the size is about 1.6 mm (0.063 inch), the slots 26 between the wires 22 will be about 0.75 mm (0.03 inch). The spacing for the channel gaps 34 will be greater than the spacing for the slots 26 between the wires 22. This facilitates the removal of particulates that accumulate in the region 38 underneath the angled rods 24. The fines that pass through the slots 26 will be less than the spacing of the wires 22 and therefore having the gaps 34 with a larger spacing will allow for all the fines to pass through the gaps by the application of a pressurized stream across the screen during a cleaning cycle of the reactor in the reverse direction to the flow of fluid during the normal operation of the reactor.

As shown in FIG. 1, the screen assembly for an outer screen 20 forms a cylindrical structure that has the wires 22 on the inside of the screen 20 and the angled rods 24 are on the outside of the screen 20. The screen assembly for the inner screen 30 forms a cylindrical structure that has the wires 22 on the outside of the screen 30 and the angled rods 24 are on the inside of the screen 30.

The angle rod screen design is also useful in other screen assembly shapes where there is cross-flow of a fluid, and a downward flow of the catalyst. Other screen assembly shapes include a scallop design with the wires 22 oriented to be substantially parallel to the axis of the scallop. The scallop design can be found in U.S. Pat. No. 6,224,838 B1, issued on May 1, 2001, which is incorporated by reference in its entirety. A particular design includes the optimizer scallop where the wires 22 are substantially parallel to the axis of the optimizer scallop. The optimizer scallop has a design that has a substantially box shaped cross section where the screen forms one side of the box with the screen side facing the reactor.

A typical process is catalytic dehydrogenation, where a catalyst flows down the reactor in a catalyst bed, and a fluid, a gas in this process, flows across the catalyst bed. This process is used for the production of propylene from propane, and isobutylene from isobutene. The fluid typically flows from outside the catalyst bed to an inner tube where the product is collected and directed from the reactor. Olefin production is important for producing the precursors to widely used plastics, such as polypropylene.

While the invention has been described with what are presently considered the preferred embodiments, it is to be understood that the invention is not limited to the disclosed embodiments, but it is intended to cover various modifications of the plates, combinations of plates, and equivalent arrangements included within the scope of the appended claims.

What is claimed is:

1. A screen assembly for collecting and distributing a process flow stream comprising:
   a plurality of wires spaced apart in a substantially parallel orientation and fixedly mounted to a support relative to each other and forming a screen, wherein the spaces define slots between neighboring wires for the passage of a fluid; and
   a plurality of angled rods, having a generally L shaped configuration, with a first edge at one end of the L shape and a second edge at the other end of the L shape, where the first edge is affixed to the plurality of wires in a substantially perpendicular orientation relative to the wires and providing the support, and the angled rods form a partially covered channel on one side of the screen with the second edge of the angled rods spaced apart from a neighboring angled rod to form a channel gap, and where the channel gap is greater than the slots between neighboring wires; and wherein the angled rods have apertures formed in the angled rods, and wherein the total open area of the apertures and the channel gaps is greater than the total open area of the slots between the wires.

2. The screen assembly of claim 1 wherein an angled rod is periodically attached to a neighboring angled rod.

3. The screen assembly of claim 1 wherein the wires are profiled wires and have a substantially flat side opposite the side to which the wires are affixed to a support.

4. The screen assembly of claim 1 wherein the total open area of the channel gaps is greater than the total open area of the slots between the wires.

5. The screen assembly of claim 1 wherein the spacing between the second edge and the neighboring angled rod is at least equal to the spacing between neighboring wires.

6. The screen assembly of claim 1 wherein the spacing between neighboring wires is less than 0.5 times the size of catalyst particles to be used in a reactor containing the screen assembly.

7. The screen assembly of claim 1 wherein the assembly is cylindrical in shape and the wires are oriented to be substantially parallel to the axis of the cylinder.

8. The screen assembly of claim 7 wherein the wires are on the inside of the cylinder and the angled rods are on the outside of the cylinder.

9. The screen assembly of claim 7 wherein the wires are on the outside of the cylinder and the angled rods are on the inside of the cylinder.

10. The screen assembly of claim 1 wherein the assembly is shaped like a scallop and the wires are oriented to be substantially parallel to the axis of the scallop.

11. The screen assembly of claim 1 wherein the assembly is shaped like an optimizer scallop and the wires are oriented to be substantially parallel to the axis of the optimizer scallop.

\* \* \* \* \*